No. 664,788. Patented Dec. 25, 1900.
W. H. SMITH.
COMBINED RAKE AND MARKER.
(Application filed July 10, 1900.)
(No Model.)
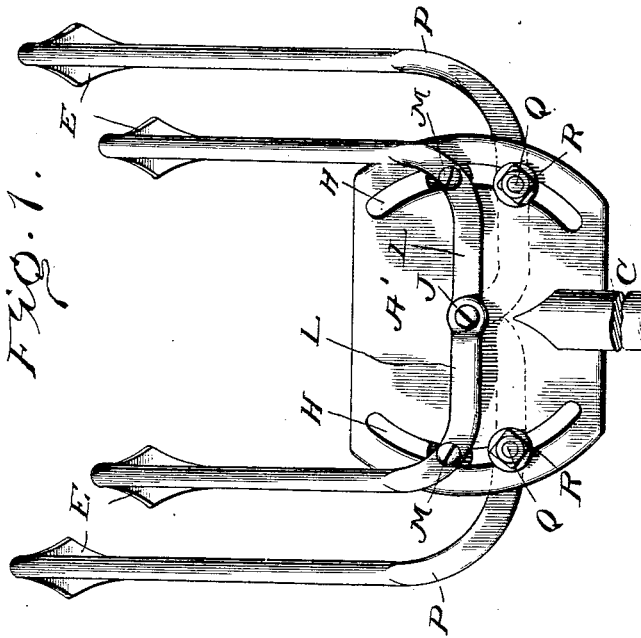
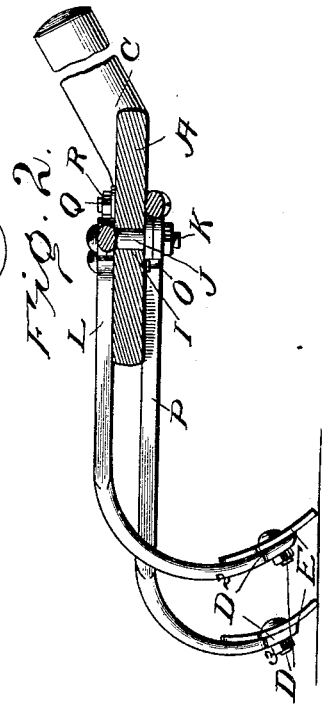

United States Patent Office.

WILLIAM H. SMITH, OF BURR OAK, KANSAS, ASSIGNOR OF ONE-HALF TO POWELL B. PORTER.

COMBINED RAKE AND MARKER.

SPECIFICATION forming part of Letters Patent No. 664,788, dated December 25, 1900.

Application filed July 10, 1900. Serial No. 23,097. (No model.)

*To all whom it may concern:*

Be it known that I, WILLIAM H. SMITH, a citizen of the United States, residing at Burr Oak, in the county of Jewell and State of Kansas, have invented certain new and useful Improvements in a Combined Rake and Marker; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in a combined rake and marker and is embodied in the novel parts, arrangement, and combinations of parts hereinafter described, and particularly set forth in the claims.

In the accompanying drawings is shown one form of the invention; but it is to be understood that the invention is not limited in its useful applications to the particular construction which for the sake of illustration is therein illustrated.

In the drawings, Figure 1 is a plan view of a combined rake and marker embodying my invention. Fig. 2 is a longitudinal vertical section thereof.

In the construction shown, A' indicates a head, which is comparatively broad and short. In this construction the head is provided with two oppositely-arranged curved or arc-shaped slots H H, and between these slots and concentric therewith is a pivot or bolt hole I. Through this hole I passes a pivot-bolt J, provided with a set-nut or thumb-nut K.

L L indicate teeth-shanks which lie on the upper side of the head A' and are provided at their inner ends with holes through which the bolt J passes, the shanks being thereby pivoted on said bolt between the head A' and the head of the bolt. Intermediate of the ends of the shanks and registering with slots H H are holes through which pass bolts M, provided with set-nuts or thumb-nuts O, which latter are adapted to clamp the shanks in angularly-adjusted positions. On the opposite side of the head are two teeth-shanks P P, which, like the shanks L, are provided at their inner ends with holes through which the bolt J passes, the ends of the shank lying between the head of the bolt and the head A'. The shanks P are also provided with holes registering with the slots H H, through which and the slots pass bolts Q, provided with set-nuts or thumb-nuts R, adapted to clamp the shanks P P in angularly-adjusted positions. The shanks L and P are provided at their outer ends with downturned portions, to which are detachably secured teeth E, which are conveniently, as shown, provided with two points and are detachably secured, as by means of bolts and nuts $D^2$ and $D^3$, so that the teeth can be reversed when necessary, and the outer shanks are shown as being longer than the inner ones, so that the teeth may be positioned in different planes. By pivoting the shanks L on one side and the shanks P on the other side of the head A' more ready adjustment can be effected, inasmuch as the shanks do not underlie and engage each other, which would be the case if all of the shanks were pivoted on the bolt J on the same side of the head A'.

In the use of the combined rake and marker described it will be understood that when it is desired to rake trash or large stuff the shanks are adjusted to throw the teeth farther apart, whereas when fine stuff is to be raked the shanks are adjusted to bring the teeth nearer together. When desired, also, the teeth may be removed from the ends of the shanks, which latter in many instances serve the purpose better than the wide teeth. When it is desired to use the device as a marker, it is only necessary to adjust two or more of the shanks to the necessary position and detach the other shanks from the head by loosening and removing their pivot-bolts.

Having thus described the invention, what is claimed, and desired to be secured by Letters Patent, is—

1. The combination with a head, and a handle therefor, of a plurality of teeth-shanks pivoted concentrically on opposite sides of said head, and means for independently securing each shank in adjusted positions, substantially as described.

2. The combination with a head, and a handle therefor, of a pivot secured to said head, a plurality of teeth-shanks each pivoted on said pivot, part of said shanks located on one side and part on the opposite side of said head, said head having curved slots concentric with said pivot, and an adjusting device for each shank working in one of said slots, whereby said shanks can be independently adjusted angularly, substantially as described.

3. The combination of a head, a handle therefor, a pivot-bolt passing through said head, a plurality of teeth-shanks pivoted on said pivot-bolt on one side of the head, a plurality of teeth-shanks pivoted on said bolt on the opposite side of the head, said head having curved slots concentric with said pivot-bolt, adjusting-bolts for said shanks passing through said curved slots, and set-nuts for said bolts, whereby said shanks can be independently adjusted angularly, substantially as described.

In testimony whereof I affix my signature in presence of two witnesses.

WILLIAM H. SMITH.

Witnesses:
   C. S. COLONY,
   F. P. HATCH.